US008465352B2

(12) United States Patent
Kawabata

(10) Patent No.: US 8,465,352 B2
(45) Date of Patent: Jun. 18, 2013

(54) GAME DEVICE, IMAGE GENERATION METHOD, INFORMATION RECORDING MEDIUM AND PROGRAM

(75) Inventor: Yasuhiro Kawabata, Tokyo (JP)

(73) Assignee: Konami Digital Entertainment Co. Ltd., Tokyo (JP)

( * ) Notice: Subject to any disclaimer, the term of this patent is extended or adjusted under 35 U.S.C. 154(b) by 439 days.

(21) Appl. No.: 12/744,916

(22) PCT Filed: Nov. 26, 2008

(86) PCT No.: PCT/JP2008/071434
§ 371 (c)(1), (2), (4) Date: May 26, 2010

(87) PCT Pub. No.: WO2009/069648
PCT Pub. Date: Jun. 4, 2009

(65) Prior Publication Data
US 2010/0304808 A1 Dec. 2, 2010

(30) Foreign Application Priority Data
Nov. 28, 2007 (JP) .................... 2007-307682

(51) Int. Cl.
*A63F 9/24* (2006.01)
*A63F 13/00* (2006.01)

(52) U.S. Cl.
USPC .................................. 463/2; 463/30; 463/43

(58) Field of Classification Search
USPC ....................................... 463/2, 30
See application file for complete search history.

(56) References Cited

U.S. PATENT DOCUMENTS

| | | | | |
|---|---|---|---|---|
| 6,283,861 | B1 * | 9/2001 | Kawai et al. | 463/43 |
| 6,589,120 | B1 * | 7/2003 | Takahashi | 463/51 |
| 6,614,436 | B2 * | 9/2003 | Kawakami et al. | 345/474 |
| 6,821,206 | B1 * | 11/2004 | Ishida et al. | 463/43 |

(Continued)

FOREIGN PATENT DOCUMENTS

| | | |
|---|---|---|
| JP | 09-131466 | 5/1997 |
| JP | 10-031410 | 2/1998 |

(Continued)

OTHER PUBLICATIONS

Final Fantasy Tactics—Playstation Game Manual, pp. 1-16, released 1998.*

(Continued)

*Primary Examiner* — David L Lewis
*Assistant Examiner* — Shauna-Kay Hall
(74) *Attorney, Agent, or Firm* — Howard & Howard Attorneys PLLC

(57) ABSTRACT

A plane defining unit (241) defines a horizontal plane in the field of view, within whose bounds an own character exists. A block division unit (242) divides the defined plane into a plurality of blocks. An aiming position selecting unit (243) randomly selects a predetermined number of aiming positions, which are arbitrary positions in each of the blocks thus divided. An reaching determining unit (244) determines whether a bullet can reach each of the target positions thus selected, based on a positional relationship with an opponent character, who conducts shooting, and the like. An aiming position deciding unit (245) randomly decides one target position from among the target positions determined to be reachable. An image generating unit (250) generates a game image including the own character attacked by a bullet shoot at the decided target position.

8 Claims, 10 Drawing Sheets

U.S. PATENT DOCUMENTS

| | | | |
|---|---|---|---|
| 6,852,032 B2 * | 2/2005 | Ishino | 463/30 |
| 7,803,048 B2 * | 9/2010 | Tilston et al. | 463/31 |
| 7,963,833 B2 * | 6/2011 | Novak et al. | 463/2 |
| 8,043,149 B2 * | 10/2011 | Ortiz et al. | 463/2 |
| 2003/0232649 A1 | 12/2003 | Gizis et al. | |
| 2004/0104912 A1 * | 6/2004 | Yamamoto et al. | 345/473 |
| 2004/0166914 A1 * | 8/2004 | Ishihata et al. | 463/2 |
| 2006/0246968 A1 * | 11/2006 | Dyke-Wells | 463/1 |
| 2008/0102950 A1 * | 5/2008 | Ishii et al. | 463/31 |

FOREIGN PATENT DOCUMENTS

| | | |
|---|---|---|
| JP | 2002-052243 | 2/2002 |
| JP | 2004-000305 | 1/2004 |
| JP | 2008-000280 | 1/2008 |

OTHER PUBLICATIONS

Final Fantasy Tactics—wikipedia, pp. 1-14, http://en.wikipedia.org/wik/Final_fantasy_tactics.*

Final Fantasy Tactics—wikipedia, pp. 1-14, http://en.wikipedia.org/wik/Final_fantasy_tactics; originally released on the Playstation in Jun. 20, 1997 in Japan; then in the USA in Jan. 28, 1998.*

Taiwanese Office Action with English Translation (Issued Dec. 12, 2011).

International Search Report corresponding to the PCT application No. PCT/JP2008/071434, date of mailing Feb. 17, 2009, 6 pages total.

* cited by examiner

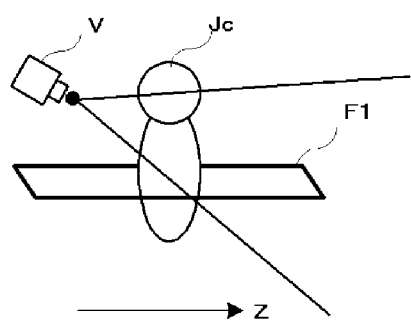
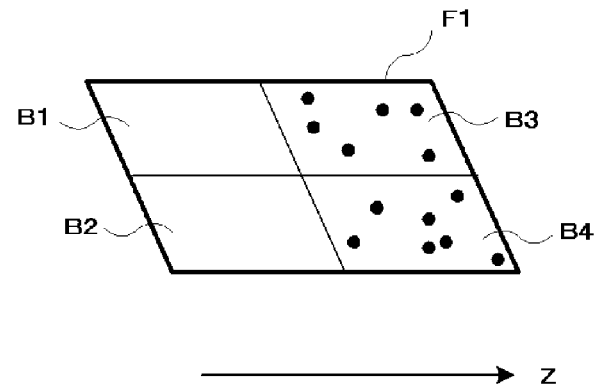
Fig. 9A            Fig. 9B
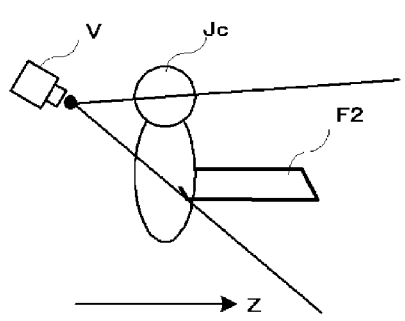
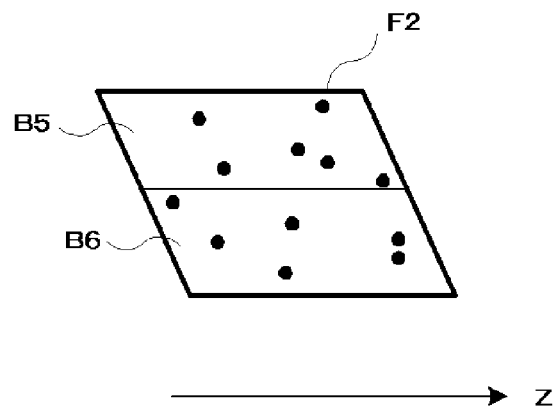
Fig. 9C            Fig. 9D

GAME DEVICE, IMAGE GENERATION METHOD, INFORMATION RECORDING MEDIUM AND PROGRAM

FIELD OF THE INVENTION

The present invention relates to a game device, image generation method, information-recording medium, and program that can properly enhance the level of tension while being exposed to attack.

TECHNICAL BACKGROUND

Traditionally, a sensory game, such as an action game or a sports game for a game device (video game device, etc.), has been popular. In such action games and the like, various changes of the situation are presented instantly (realtime) during the progress of the game in order to enhance the level of tension and realism.

For example, in an action game (such as a shooting game), characters that are enemies to each other are involved in a gunfight. The level of tension rises, including when a bullet shot by an opponent character hits a position near the own character (player character).

A game device disclosed as an example is a match-up video game device (see e.g., Patent Literature 1). This example game device uses a technique to change the bullet hitting sound depending on the distance from the hit position (aiming position) and to output wind sound when the bullet goes right by the own character.

Patent Literature 1: Unexamined Japanese Patent Application Publication No. 2002-52243 (pages 3-10 and FIG. 3)

DISCLOSURE OF THE INVENTION

Means for Solving the Problem

In the aforementioned action game (game device) for gunfight, hitting of a bullet enhances the level of tension. The player is reminded that his/her own character has been recognized by the opponent character and is within the striking distance of the opponent character. Also, the player is informed of an approximate position (direction) of the opponent character.

For example, in an image during the game (game image), the opponent character may not be seen in front of the own character (the field of view does not exist in front of the own character). Even in this situation, by looking at hitting of a bullet (bouncing off the ground, producing a cloud of dust, etc.), the player can find out that the opponent character is aiming at the own character from the side or behind.

However, unless a bullet hits a position reasonably close to the own character, the level of tension is low, and knowing the position of the opponent character is difficult.

The device may be controlled so that bullets only hit positions close to the own character. Controlling in such a simple manner eventually creates a situation where a high level of tension and the like are not provided.

For example, if bullets are controlled to always hit determined positions (the same positions relative to the own character)—e.g., immediately in front of and behind the own character—attacks from the opponent appear monotone to the player. A sufficiently high level of tension cannot be felt.

Even when a bullet hits a position near the own character, the position cannot be displayed in a game image if the position is out of bounds of the field of vision due to the viewpoint or line of sight direction. A high level of tension cannot be provided, and knowing the position of the opponent character is difficult for the player.

To solve the aforementioned problems, there has been a call for the technique to allow the opponent character to effectively hit a bullet or the like according to situations of the own character or the like and the viewpoint or the like.

The present invention is made to solve the aforementioned problems. More specifically, the present invention is directed to providing a game device, image generation method, information recording medium, and program that can properly enhance the level of tension while being exposed to attack.

Means for Solving the Problem

A game device according to a first aspect of the present invention, in which the opponent character shoots an object toward the own character (e.g., a thrown spear or stone, a shot bullet or arrow, or the like, such as a flying or injected object) in a virtual space, comprises a dividing unit, a selecting unit, a determining unit, a deciding unit, and an image generating unit.

The dividing unit divides a predetermined plane in the field of vision, within whose bounds a character exists, into a plurality of blocks. The selecting unit randomly selects a predetermined number of arbitrary target positions (e.g., aiming positions) in each of the blocks thus divided.

The determining unit determines whether the object can reach (e.g., can hit) each of the target positions thus selected, based on the positional relationship with the opponent character, who is an attacker. The deciding unit randomly decides at least one target position from among the target positions determined to be reachable. The image generating unit generates a game image including the own character attacked by an object shot at the decided target position.

Specifically, the object surely reaches a position near the own character in the field of vision, and a scene thereof is displayed as a game image. Since target positions are not always the same and are appropriately spread, attacks from the opponent are not monotone, thereby providing a sufficient level of tension. The player can find out an approximate position of the opponent character and the like by looking at how the object reaches target positions.

Consequently, the level of tension while being exposed to attack can be appropriately enhanced.

With respect to the virtual viewpoint position, the dividing unit may divide, into a predetermined number of blocks, a horizontal plane with a predetermined shape and a variable length in the depth direction (Z-axis direction).

For example, when the viewpoint position is low (i.e. the elevation angle is small), a horizontal plane with a short length in the depth direction is divided into a plurality of blocks. Conversely, when the viewpoint position is high (i.e. the elevation angle is large), a horizontal plane with a long length in the depth direction is divided into a plurality of blocks.

The area of target positions (i.e., an area where target positions can be selected) may be appropriately changed with respect to the viewpoint position.

The selecting unit may select, in each of the blocks, target positions except an area corresponding to the own character.

In this case, target positions may be selected so that the object does not hit the own character.

The determining unit may determine whether the object can reach target positions based on whether an obstacle is present or absent on paths between the position of the opponent character and the target positions.

In this case, by taking into consideration objects (such as buildings, trees, and rocks) around the own character disposed in a virtual space, only target positions that are near the own character and is reachable by the object may be determined as candidate positions.

Even when an obstacle exists on the path, the determining unit may determine that the object can reach the target position if the obstacle is located near the own character in the field of vision.

When the deciding unit has decided a target position on whose path an obstacle exists, the image generating unit may generate a game image of the object colliding the obstacle.

In this case, as a scene of an object hitting an obstacle (bullet bouncing, etc.) is displayed, a sense of tension can be created in a realistic manner.

An image generation method of a second aspect of the present invention performed by a game device comprising a calculating unit and a drawing unit, in which an opponent character shoots an object (e.g., a thrown spear or stone, a shot bullet or arrow, or the like, such as a flying or injected object) toward the own character in a virtual space, comprises: a dividing step, a selecting step, a determining step, a deciding step, and an image generating step.

Firstly, in the dividing step, a predetermined plane in the field of vision, within whose bounds a character exists, is divided into a plurality of blocks. In the selecting step, a predetermined number of arbitrary target positions (e.g., aiming positions) are randomly selected in each of the blocks thus divided.

In the determining step, whether the object can reach (e.g., can hit) each of the target positions thus selected is determined, based on the positional relationship with the opponent character, who is an attacker. In the deciding step, at least one target position is randomly decided from among the target positions determined to be reachable. In the image generating step, a game image including the own character attacked by an object shot at the decided target position is generated.

Specifically, the object surely reaches positions near the own character in the field of vision, and a scene thereof is displayed as a game image. Since target positions are not always the same and are appropriately spread, attacks from the opponent are not monotone, thereby providing a sufficiently high level of tension. The player can find out an approximate position of the opponent character and the like by looking at how the object reaches the target positions.

Consequently, the level of tension while being exposed to attack can be appropriately enhanced.

An information recording medium according to a third aspect of the present invention stores a program that causes a computer (including an electronic apparatus) to act as the aforementioned game device.

A program according to a fourth aspect of the present invention stores a program that causes a computer (including an electronic apparatus) to act as the aforementioned game device.

This program can be recorded in a computer-readable information recording medium, such as a compact disk, a flexible disk, a hard disk, an magnetic optical disk, a digital video disk, a magnetic tape, or a semiconductor memory.

The aforementioned program may be distributed or sold via a computer communication network, separately from a computer in which the program is to be installed. Also, the aforementioned information recoding-medium may be distributed or sold, separately from a computer in which the program is to be installed.

Effect of the Invention

According to the present invention, the level of tension while being exposed to attack can be properly enhanced.

BRIEF DESCRIPTION OF THE DRAWINGS

FIG. 9A is a diagram explaining a plane viewed from a first-person viewpoint.
FIG. 9B is a diagram explaining a plane divided into a plurality of blocks.
FIG. 9C is a diagram explaining a plane viewed from a first-person viewpoint.
FIG. 9D is a diagram explaining a plane divided into a plurality of blocks.

EXPLANATION OF REFERENCE NUMERALS

Figure 1:
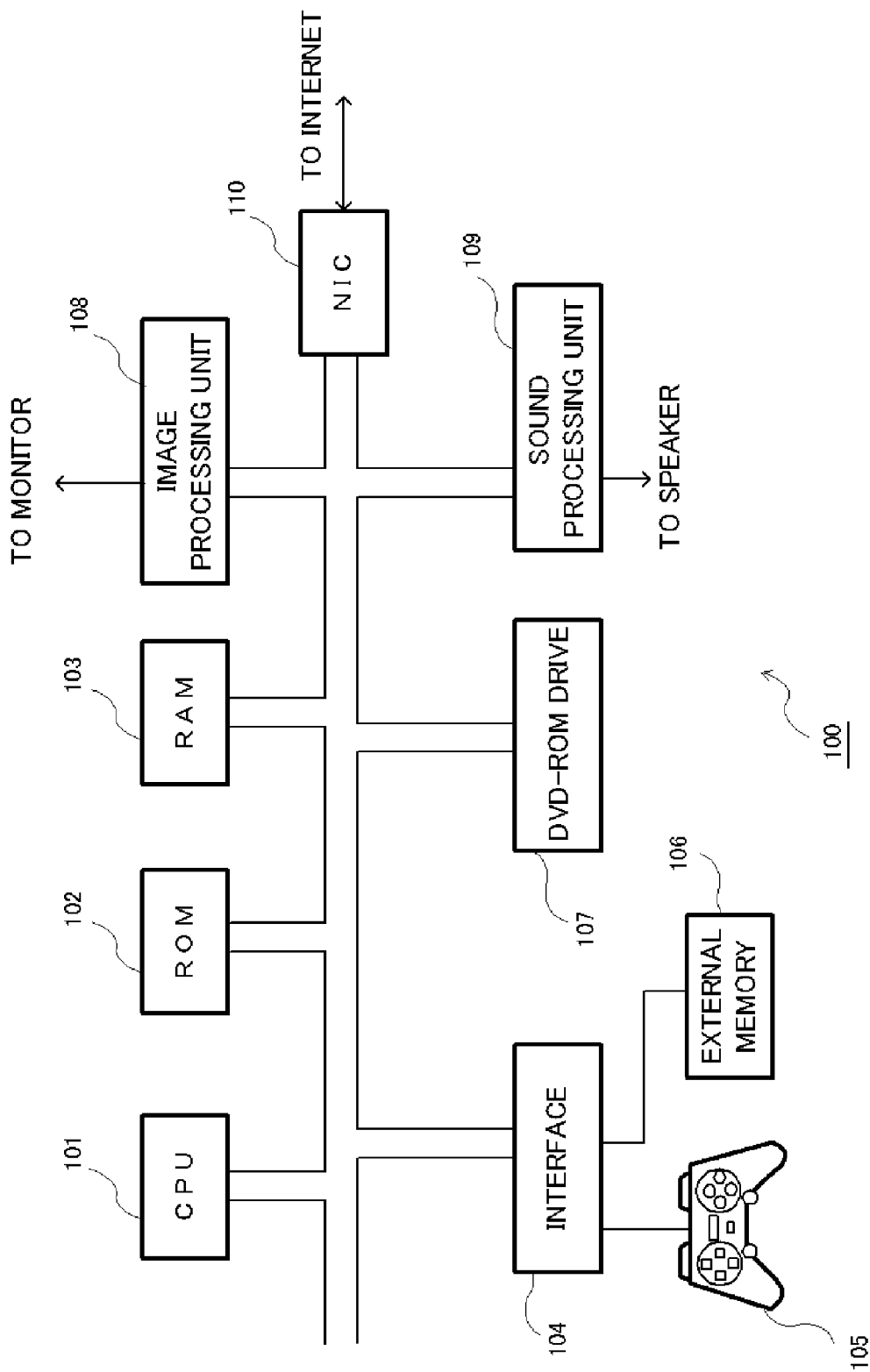
FIG. 1 is a diagram illustrating a general configuration of an information processing device according to an embodiment of the present invention.

100 information processing device
101 CPU
102 ROM
103 RAM
104 interface
105 controller
106 external memory
107 DVD-ROM drive
108 image processing unit
109 sound processing unit
110 NIC
200 game device
210 object information storage unit 220 operation accepting unit
230 position managing unit
240 aiming position calculating unit
250 image drawing unit

BEST MODE FOR CARRYING OUT THE
INVENTION

Embodiments of the present invention are explained below. For the ease of understanding, embodiments in which the present invention is applied to a game device are explained. The present invention is also applicable to as various kinds of information processing devices, such computers, PDAs, and cellular phones. The embodiments explained below are presented for the sake of explanation and in no way limit the scope of the present invention. One of ordinary skill in the art can adopt the embodiments by replacing all or some of the components thereof by their equivalents, and such embodiments are still within the scope of the present invention as well.

(Embodiment 1)

FIG. 1 is a diagram illustrating a general configuration of a typical information processing device which embodies a game device according to an embodiment of the present invention. Explanations will be provided below in reference to this figure.

The information processing device 100 comprises a CPU (Central Processing Unit) 101, a ROM (Read Only Memory) 102, a RAM (Random Access Memory) 103, an interface 104, a controller 105, an external memory 106, a DVD (Digital Versatile Disk)-ROM drive 107, an image processing unit 108, a sound processing unit 109, and an NIC (Network Interface Card) 110.

By inserting into the DVD-ROM drive 107 a DVD-ROM storing the program and data for the game and turning on the power of the information processing device 100, the program is launched, and the game device according to this embodiment is achieved.

The CPU 101 controls the overall operation of the information processing device 100 and is connected to other components for exchanging control signals and data.

In the ROM 102, an Initial Program Loader (IPL), which is executed immediately after the power is turned on, is recorded. Upon execution of the IPL, the program recorded in the DVD-ROM is read out to the RAM 103 for execution by the CPU 101. Programs and data of the operating system required for the overall control and operation of the information processing device 100 are recorded in the ROM 102.

The RAM 103 is used for temporary storage of data and programs. The RAM 103 holds the data and programs read out from the DVD-ROM as well as other data needed for the progress of the game and chat communications.

The controller 105, which is connected via the interface 104, receives manipulation inputs from the user for game play. For example, the controller 105 receives inputs of strings (messages), etc. according to manipulation inputs.

The external memory 106 is detachably connected via the interface 104. Data rewritably recorded in the external memory 106 include data on the progress of the game and logs (records) of chat communications. The user can appropriately record such data in the external memory 106 by inputting instructions via the controller 105.

In the DVD-ROM to be mounted on the DVD-ROM drive 107, a program for executing the game as well as image and sound data that accompany therewith are recorded. Under control of the CPU 101, the DVD-ROM drive 107 reads out, from the DVD-ROM mounted thereon, a required program and data. The program and data are stored temporarily in the RAM 103, etc.

The image processing section 108, upon processing of the data read out from the DVD-ROM by an image operation processor (not shown) comprised in the image processing section 108 and the CPU 101, records the data in a frame memory (not shown) comprised in the image processing section 108. The image information recorded in the frame memory is converted into video signals at a predetermined synchronization timing and output to a monitor (not shown) connected to the image processing section 108. Many kinds of image display are thereby enabled.

The image operation processor can perform overlay calculation for 2D images, transparent operations (alpha blending, etc.), and many kinds of saturate calculation at high speeds.

It is also possible to perform a high-speed operation to acquire a rendering image from information on a polygon, which is arranged within a virtual 3D space and to which various kinds of texture information are added. In such an operation, the Z buffer method is used for rendering the information on the polygon to acquire the rendering image in which the polygon in a virtual 3D space can be seen from a predetermined viewpoint position.

Further, by cooperation of the CPU 101 and the image operation processor, a string can be drawn as a 2D image in the frame memory or on each polygon surface according to font information defining text shapes. The font information is recorded in the ROM 102, but dedicated font information recorded in the DVD-ROM can be used as well.

The sound processing section 109 converts sound data read out from a DVD-ROM into an analog sound signal and outputs the sound signal from a speaker (not shown) connected thereto. Under control of the CPU 101, the sound processing section 109 generates sound effects and music data to be generated during the game and outputs sound equivalent thereto from the speaker.

The NIC 110 is used for connecting the information processing device 100 to a computer communication network (not shown), such as the Internet. The NIC 110 comprises ones compliant with the 10 BASE-T/100 BASE-T standard which is used to configure a LAN (Local Area Network), an analog modem for Internet connection via a telephone circuit, an ISDN (Integrated Services Digital Network) modem, an ADSL (Asymmetric Digital Subscriber Line) modem, a cable modem for Internet connection via a cable television circuit and the like, and an interface (not shown) which intervenes between these modems and the CPU 101.

In addition, the information processing device 100 may employ a large-capacity external storage device, such as a hard disk, so that the information processing device 100 has the functions equal to those of the ROM 102, the RAM 103, the external memory 106, a DVD-ROM loaded onto the DVD-ROM drive 107, and the like.

It is also possible to adopt an embodiment in which a keyboard for accepting user input of string editing and a mouse for accepting user input of selecting and indicating positions are connected.

In lieu of the information processing device 100 according to this embodiment, an ordinary computer (a general personal computer, etc.) can be used as a game device. For example, as in the case of the information processing device 100, an ordinary computer comprises a CPU, a RAM, a ROM, a DVD-ROM drive, an NIC, an image processing section with features not as advanced as those of the information processing device 100, and a hard disk as an external storage device. It is also designed to be able to use a flexible disk, a magnetic optical disk, a magnetic tape, etc. Input devices employed include not a controller, but a keyboard and a mouse. After the computer is installed with the game program and the program is executed, the computer acts as the game device.

(General Configuration of Game Device)

Figure 2:
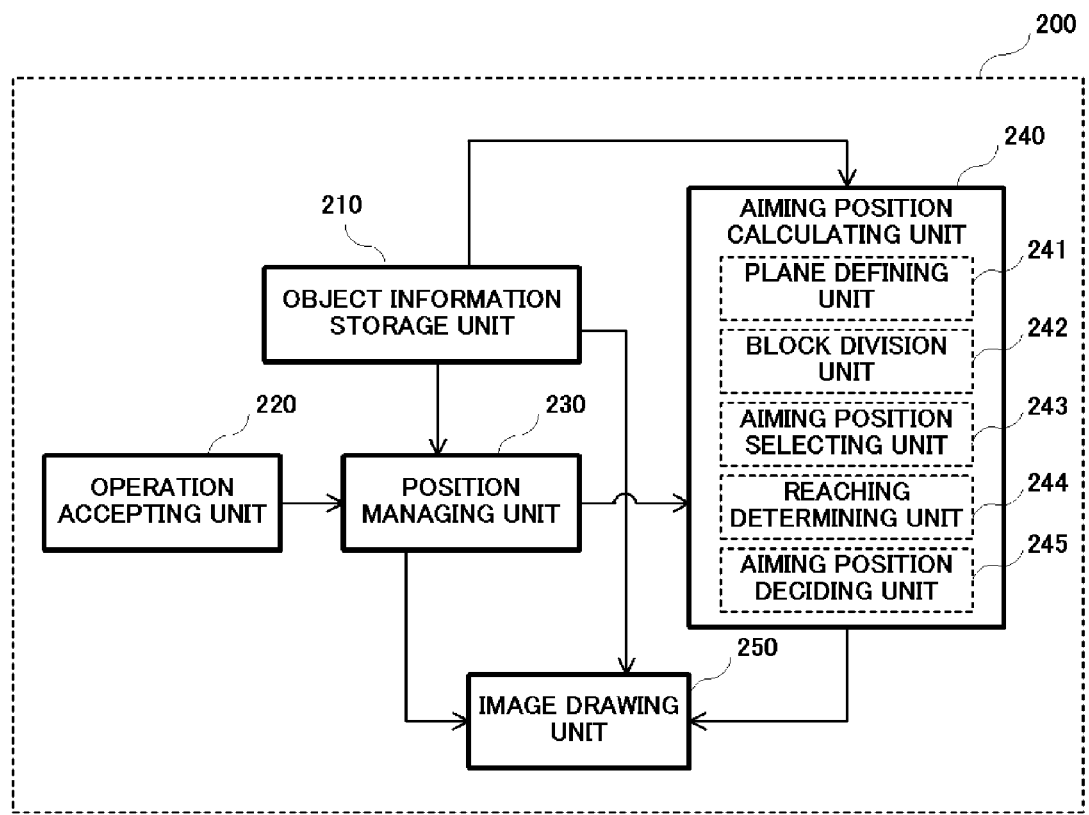
FIG. 2 is a diagram illustrating a general configuration of a game device according to an embodiment of the present invention.

FIG. 2 is a diagram illustrating a general configuration of a game device according to this embodiment. This game device is a device that embodies effective reaching (hitting) of a bullet. One example is an action game (shooting game, etc.) where characters who are enemies to each other are engaged in a gunfight. Explanations will be provided in the text to follow with reference to this figure.

As shown in the figure, the game device 200 comprises an object information storage unit 210, an operation accepting unit 220, a position managing unit 230, an aiming position calculating unit 240, and an image drawing unit 250.

The object information storing section 210 stores information on objects placed in a virtual space, such as an own character (character operated by the player), an opponent character, trees, rocks, and buildings. Specifically, information on 3D models and texture is stored for each object.

The RAM 103 and the like can act as the object information storage unit 210.

The manipulation accepting section 220 accepts manipulation inputs, such as instructions to the own character operated by the player regarding what action to take. For example, the manipulation accepting section 220 accepts inputs to manipulate the own character, which the player makes by pressing a plurality of buttons (e.g., direction keys, button A, button B, button X, and button Y provided on the controller 105). These buttons are associated with actions such as moving to a specific direction, preparing for shooting the gun, shooting the gun, ducking, and diving to the ground.

The controller 105 can act as the manipulation accepting section 220.

The position managing section 230 manages positional information (current position, direction, etc.) on objects, such as the own character and the opponent character, whose positions change in a virtual space. For example, in response to travel instructions and the like accepted by the manipulation accepting section 220, the own character changes its position and travel direction in a virtual space so that such positional information is managed by the position managing section 230. The opponent character travels appropriately according to a specific logic as well and changes its position and the like in a virtual space, so the positional information on the opponent character is likewise managed.

The RAM 103 and the CPU 101 can act as the position managing section 230.

The aiming position calculating unit 240 controls shooting from the opponent character and the like and performs various calculations for aiming positions of bullets to be shoot.

Specifically, the aiming position calculating unit 240 comprises a plane defining unit 241, a block division unit 242, an aiming position selecting unit 243, a reaching determining unit 244, and an aiming position deciding unit 245.

The plane defining unit 241 defines a predetermined plane in the field of vision within whose bounds the own character exists (within the field of vision with reference to the viewpoint).

Figure 3A:
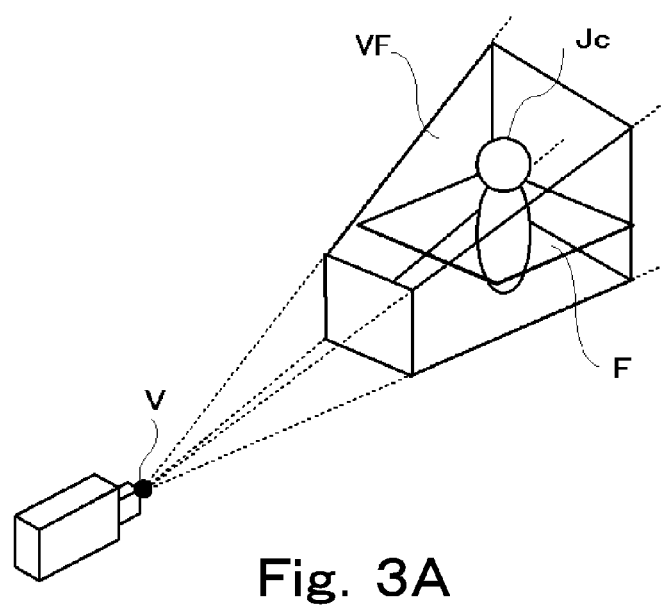
FIG. 3A is a diagram illustrating a defined plane.

For example, the plane defining unit 241 defines, as illustrated in FIG. 3A, a rectangular-shaped plane F in a visible region (view frustum) VF, within bounds of which the own character Jc exists and which is viewed from the viewpoint V.

This plane F is, for example, a horizontal plane centered around the own character Jc at a predetermined height (e.g., the height of the knees of the own character Jc). The size and the like are variably defined based on the position of the viewpoint V (elevation angle, etc.).

Figure 3B:
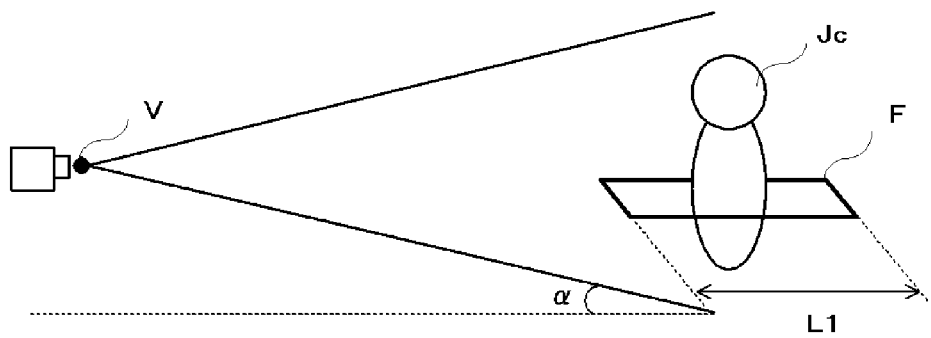
FIG. 3B is a diagram illustrating a defined plane.
Figure 3C:
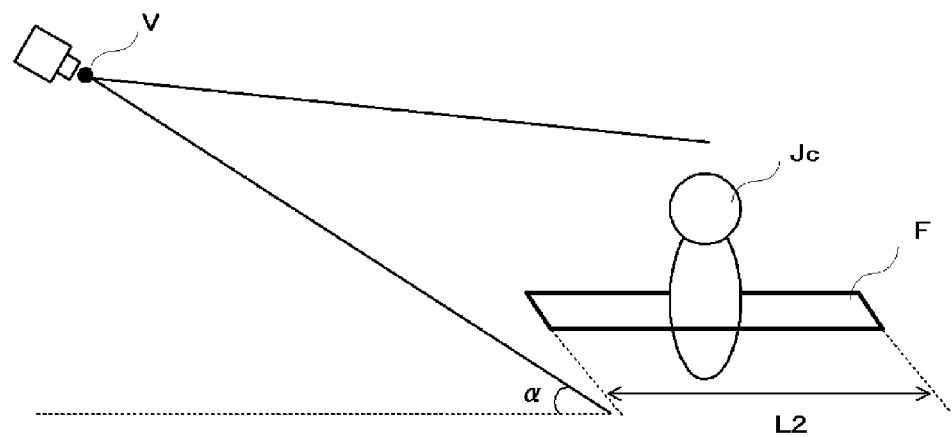
FIG. 3C is a diagram illustrating a defined plane.

Specifically, the plane defining unit 241 defines, as illustrated in FIG. 3B, the plane F which has a short length (L1) in the depth direction (Z-axis direction) when the position (height) of the viewpoint V is low (i.e., the elevation angle α is small). Conversely, the plane defining unit 241 defines, as illustrated in FIG. 3C, the plane F which has a long length (L2) in the depth direction when the position (height) of the viewpoint V is high (i.e., the elevation angle α is large).

Here, a situation of defining a rectangular-shaped plane is explained as an example. However, the shape of a plane defined by the plane defining unit 241 is not limited to rectangular, but optional. The shape of a plane may be circle, ellipse, or the like.

Back to FIG. 2, the block division unit 242 divides the plane defined by the aforementioned plane defining unit 241 into a plurality of blocks.

Figure 4A:
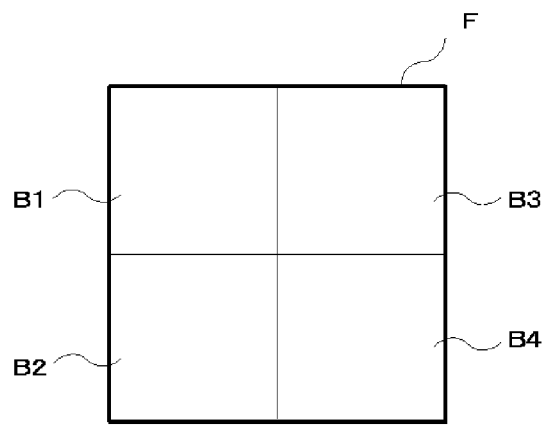
FIG. 4A is a diagram illustrating a plane divided into a plurality of blocks.

For example, as illustrated in FIG. 4A, the block division unit 242 divides the plane F into four blocks (blocks B1-B4). This plane F is a view from directly above.

Figure 4B:
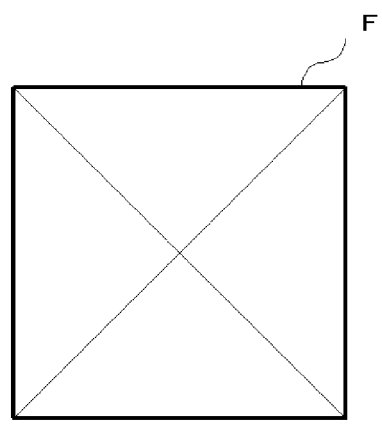
FIG. 4B is a diagram illustrating a plane divided into a plurality of blocks.
Figure 4C:
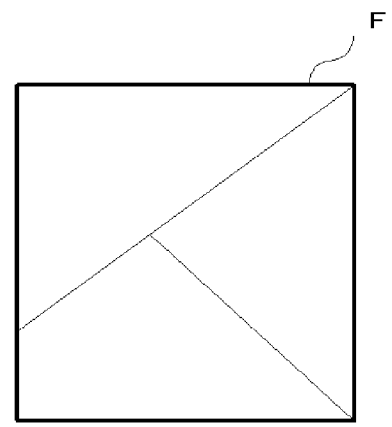
FIG. 4C is a diagram illustrating a plane divided into a plurality of blocks.

The dividing method is not limited to such 2×2 matrix, but it is optional. For example, as illustrated in FIG. 4B, division may be made by diagonal lines. The number of divided blocks is not limited to four, as in the above case, and it can be appropriately increased or decreased. For example, the number of divided blocks may be three, as illustrated in FIG. 4C.

Back to FIG. 2, the aiming position selecting unit 243 randomly selects a predetermined number of aiming positions, which are arbitrary positions in each of the blocks divided by the aforementioned block division unit 242.

Figures 5A, 5B:
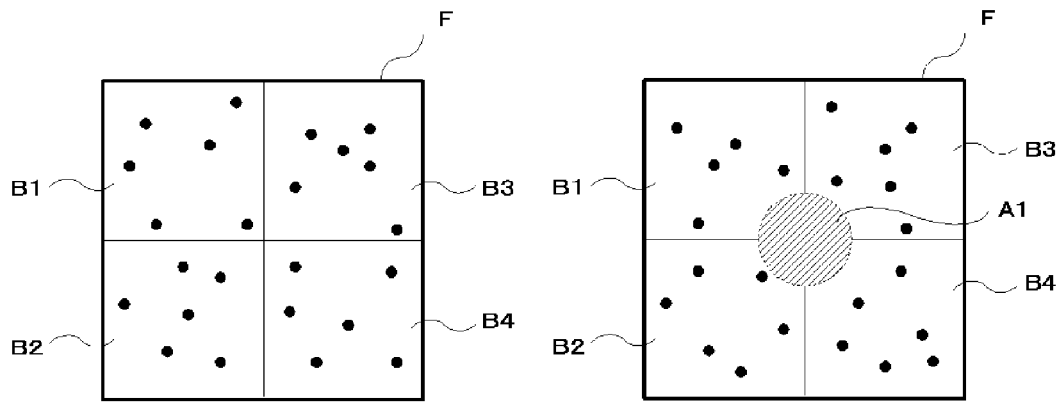
FIG. 5A is a diagram illustrating example aiming positions randomly selected in each divided block.
FIG. 5B is a diagram illustrating example aiming positions randomly selected in each divided block.
Figure 5C:
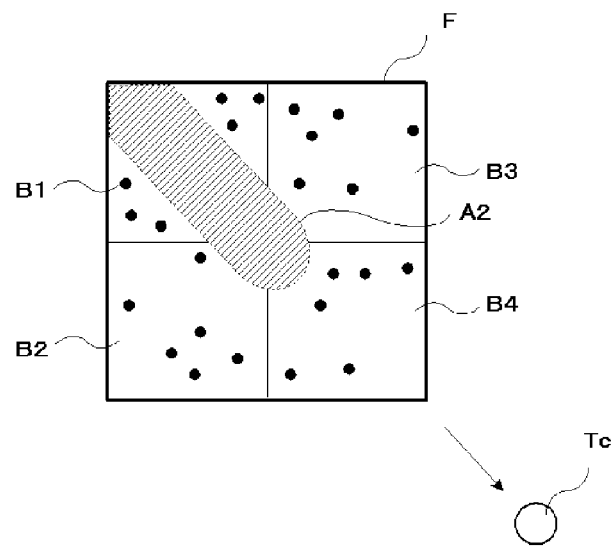
FIG. 5C is a diagram illustrating example aiming positions randomly selected in each divided block.

For example, as illustrated in FIG. 5A, the aiming position selecting unit 243 randomly selects six aiming positions in each of the blocks B1-B4. In this case, the aiming position selecting unit 243 may take the own character Jc into consideration for randomly selecting each aiming position. As illustrated in FIG. 5B, it can be done by excluding an area A1, which corresponds to the area of the own character Jc. The position (direction) of the opponent character Tc, who conducts shooting (i.e., shoots the gun), may be taken into consideration. As illustrated in FIG. 5C, aiming positions may be randomly selected from areas other than an area A2, which extends toward the direction opposite to the opponent character Tc.

An example of randomly selecting six aiming positions in each block has been explained. However, the number of aiming positions is not limited to six as in the case of the above example, and it can be appropriately increased or decreased.

Back to FIG. 2, the reaching determining unit 244 determines whether each of the aiming positions selected by the aforementioned aiming position selecting unit 243 can be reached (hit) based on the positional relationship with the opponent character, who conducts shooting, and the like.

The reaching determining unit 244 determines whether an aiming position can be reach based on whether an obstacle is present or absent on the bullet path between the opponent character position and the aiming position in a virtual space.

Figure 6A:
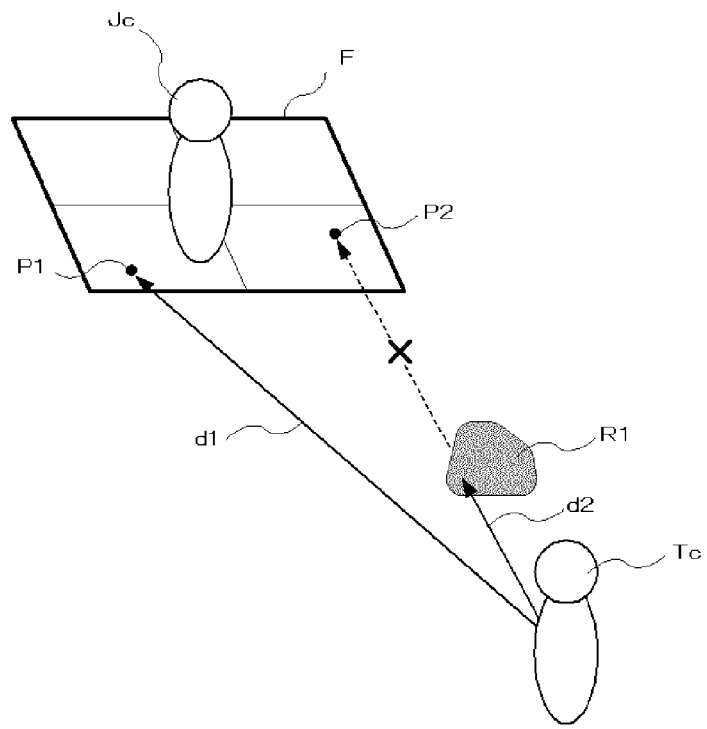
FIG. 6A is a diagram explaining a situation of determining whether a bullet reaches an aiming position.

Specifically, to determine whether an aiming position P1 can be reach, as illustrated in FIG. 6A, the reaching determining unit 244 calculates a bullet path d1 between the position of the opponent character Tc (e.g., the position of the gun) and the aiming position P1 and determines whether an obstacle exists on this bullet path d1 by referring to the object information storage unit 210 and the like. In this case, since an obstacle does not exist on the bullet path d1, the reaching determining unit 244 determines that the aiming position P1 can be reached.

Likewise, for an aiming position P2, a bullet path d2 is calculated to determine whether an obstacle is present or absent. In this case, since a rock R1 exists on the bullet path d2 (blocks the bullet path d2), the reaching determining unit 244 determines that the aiming position P2 cannot be reached (cannot be hit by a bullet).

Even when an obstacle is present on the bullet path, the reaching determining unit 244 eventually determines that the position can be reach. Such determination can be made only when the obstacle is near the own character Jc and in the field of vision.

Figure 6B:
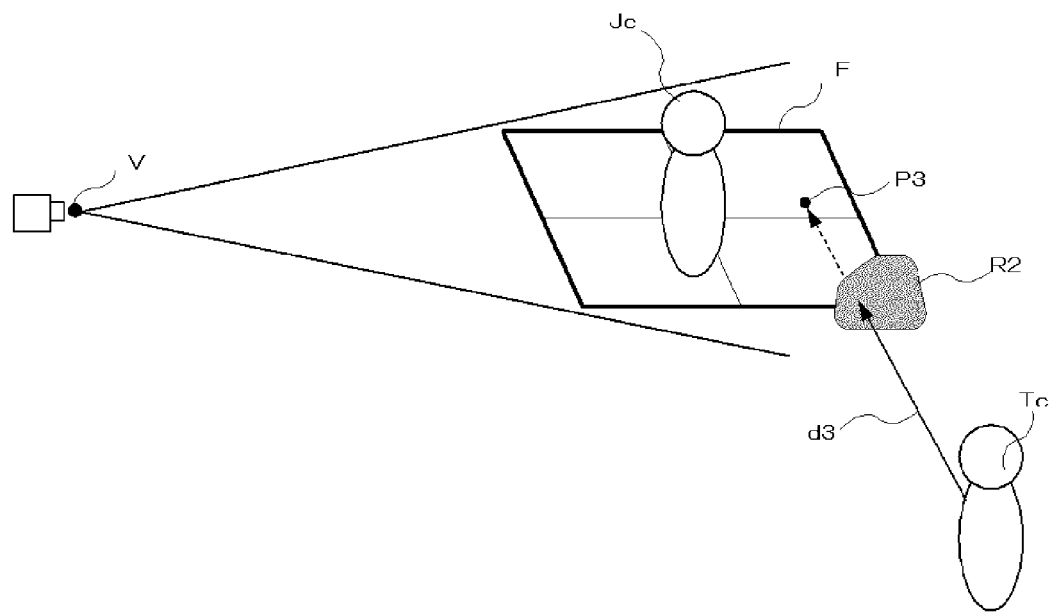
FIG. 6B is a diagram explaining a situation determining whether a bullet reaches an aiming position.

For example, as illustrated in FIG. 6B, even when a rock R2 is present on a bullet path d3, the reaching determining unit 244 determines that an aiming position P3 can be reach. Such determination is made since the position of the rock R2 is near the own character Jc (e.g., within a predetermined distance) and in the field of vision from the viewpoint V.

When the gun is shot toward the aiming position P3, the bullet hits the rock R2 near the own character Jc, and that scene is displayed as a game image. It is appropriate to treat this situation as an equivalent of the situation where the aiming position P3 is reached.

When a plurality of obstacles exist, the aforementioned determination is made for the obstacle nearest to the opponent character Tc.

In this way, the reaching determining unit 244 determines in order whether each aiming position (each of the aiming positions of each block—i.e., each of 4×6=24 positions) can be reached. The aiming positions that have been determined to be reachable (e.g., positional information on the aiming positions, etc.) are registered in a list of candidate positions. In other words, the reaching determining unit 244 registers only the reachable aiming positions in the candidate list.

Back to FIG. 2, the aiming position deciding unit 245 randomly decides one aiming position from among the aiming positions determined to be reachable (hittable) by the aforementioned reaching determining unit 244.

In other words, the aiming position deciding unit 245 randomly decides, from among the aiming positions registered in the candidate list, one aiming position as a position that is to be actually reached by a bullet.

When the gun of the opponent character Tc is an automatic fire gun, such as a machine gun, and a plurality of bullets (e.g., two bullets) are simultaneously fired, the aiming position deciding unit 245 may randomly decide a plurality of aiming positions (e.g., two aiming positions).

With these configurations, the aiming position calculating unit 240 decides at least one aiming position to be reached by a bullet shot by the opponent character only from among the aiming positions near the own character and within the field of view. This decision is made based on the viewpoint position and the positional relationship with the opponent character and an obstacle.

The CPU 101 and the like can act as this aiming position calculating unit 240.

The image drawing unit 250 draws a game image (display image), in which an object in a virtual space (within the field of view) has been converted into the viewpoint coordinate system. This image is drawn based on information on objects stored in the object information storage unit 210, positional information on the characters managed by the position managing unit 230, and the like.

For example, when the opponent character shoots the gun and the aforementioned aiming position calculating unit 240 decides one aiming position, the image drawing unit 250 generates a game image which illustrates a scene of a bullet hitting near the own character (within the field of vision).

Figure 7A:
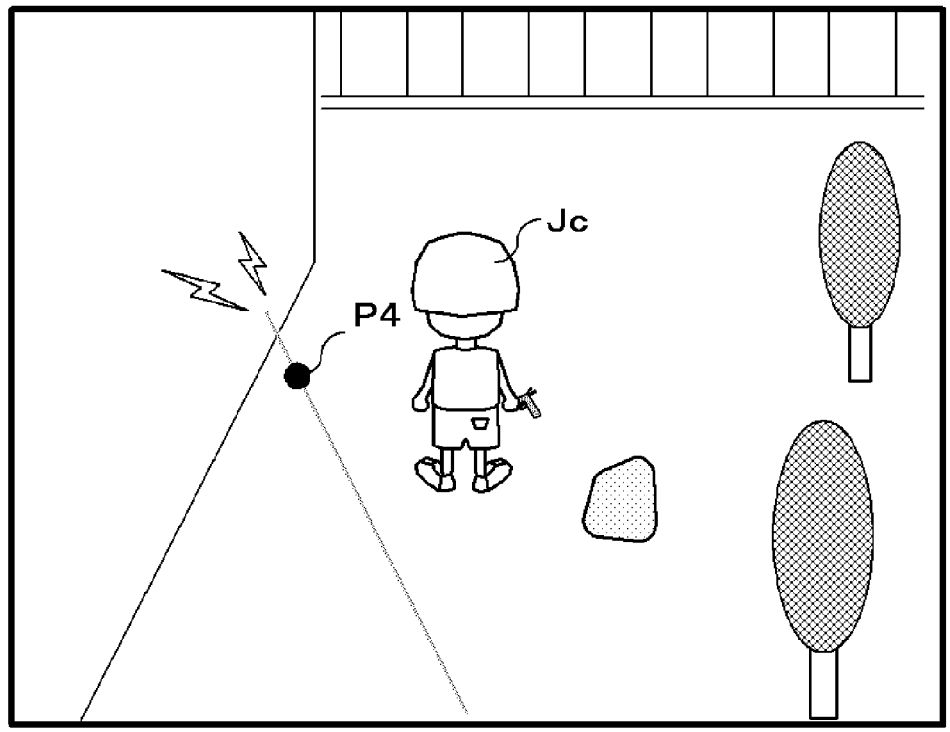
FIG. 7A is a diagram illustrating an example of a drawn game image.

Specifically, as illustrated in FIG. 7A, the image drawing unit 250 displays a game image illustrating a scene that a bullet, which has been fired at an aiming position P4, hits near the own character. The aiming position P4 is for the sake of explanation, and it is not displayed in an actual game image.

Figure 7B:
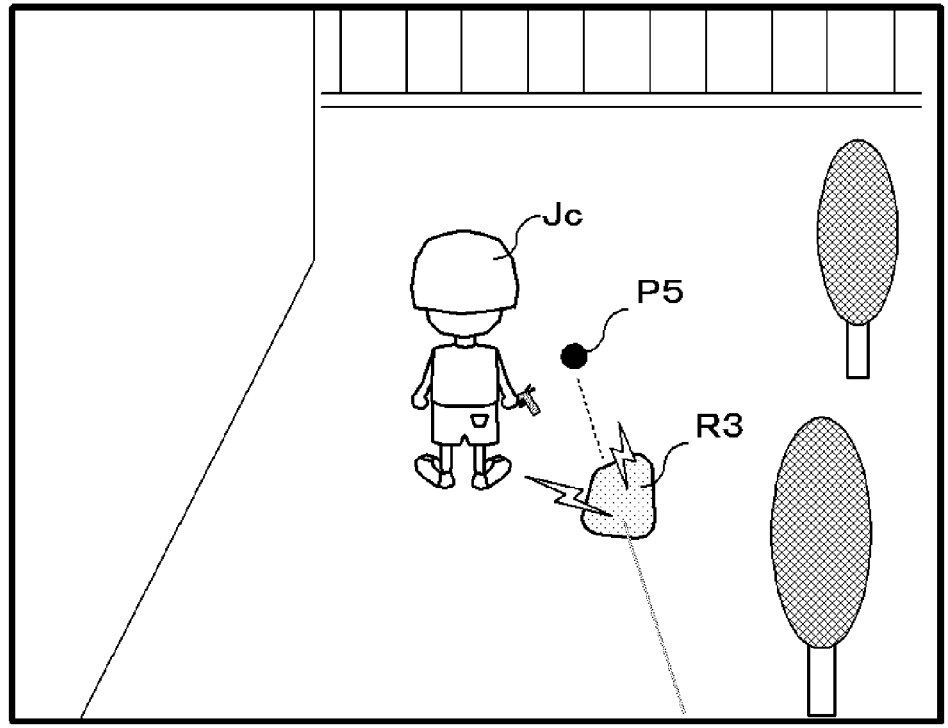
FIG. 7B is a diagram illustrating an example of a drawn game image.

In addition, as illustrated in FIG. 7B, a game image is displayed to illustrate a scene that a bullet, which has been fired at an aiming position P5, hits a rock R3 near the own character. The aiming position P5 is also for the sake of explanation, and it is not displayed in an actual game image.

The image processing unit 108 can act as this image drawing unit 250.

(Operation of Game Device)

Figure 8:
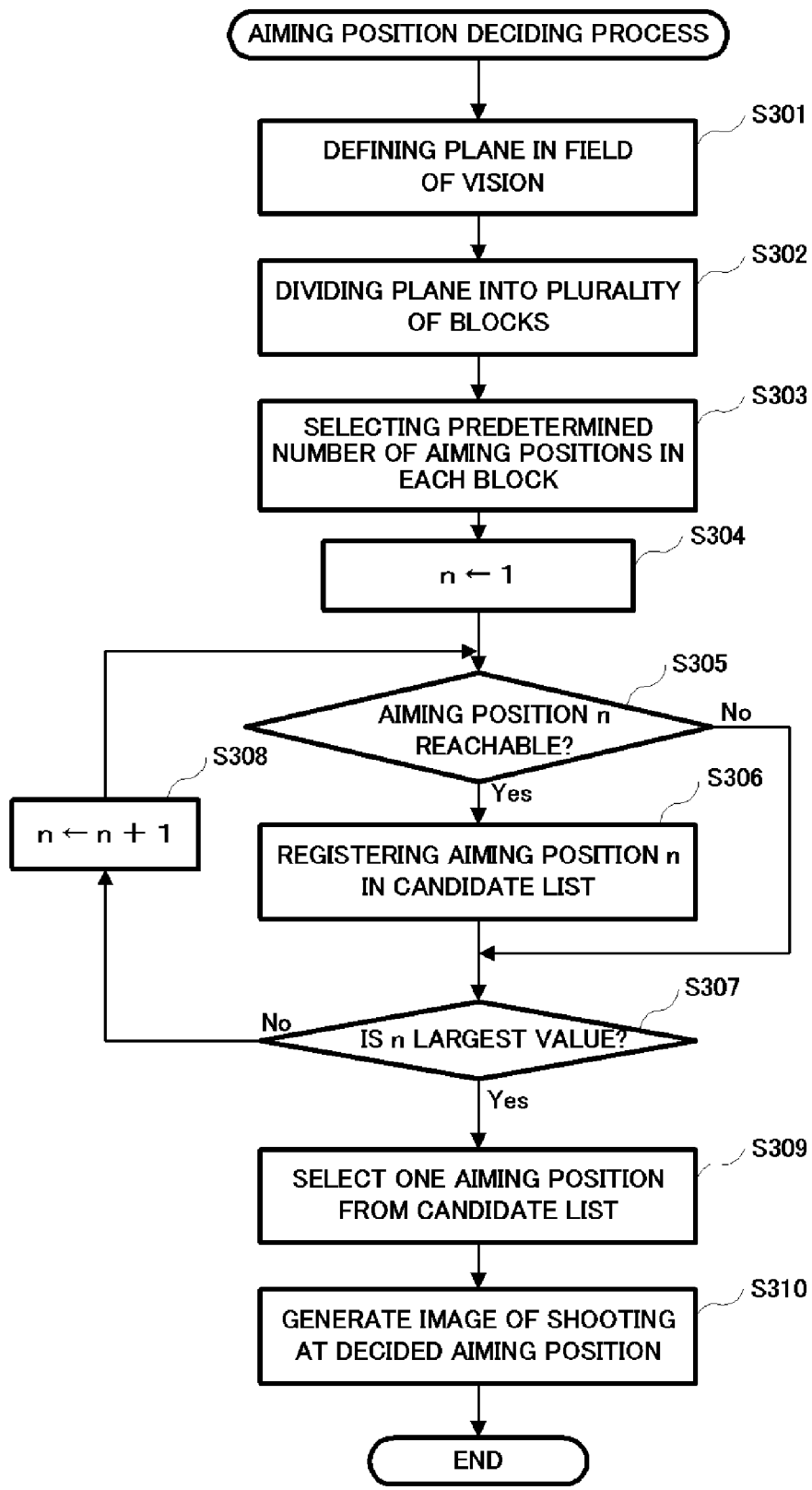
FIG. 8 is a flowchart of an example aiming position deciding process according to an embodiment of the present invention.

FIG. 8 is a flowchart of an aiming position deciding process performed by the game device 200 with the aforementioned configuration. Explanations are made on the operation of the game device 200 in the text below with reference to this figure. This aiming position deciding process is repeatedly performed each time the opponent character fires a bullet during the game. It is assumed that at the beginning of the aiming position deciding process, candidates are removed from the list (no candidates are registered therein).

Firstly, the game device 200 defines a plane in the field of vision (step S301).

Specifically, the plane defining unit 241 defines a horizontal plane in the field of vision, within whose bounds the own character exists. In this case, the plane defining unit 241 defines a rectangular-shaped plane, at least whose depth-wise length is varied with respect to the position of the viewpoint (an elevation angle, etc.).

The game device 200 divides the defined plane into a plurality of blocks (step S302).

Specifically, the block division unit 242 divides the defined plane into four blocks, as described above in FIG. 4A.

The game device 200 selects a predetermined number of aiming positions in each block (step S303).

Specifically, the aiming position selecting unit 243 randomly selects six aiming positions in each of the blocks B1-B4, as described above in FIG. 5A.

The game device 200 sets the variable n to 1, which is the initial value (step S304). This variable n is for counting the number of aiming positions in sequence. For example, it is used to count, e.g., from 1 to 24 (4×6=24).

The game device 200 determines whether the aiming position n is reachable (step S305).

Specifically, the reaching determining unit 244 determines whether the nth aiming position is reachable based on the positional relationship with the opponent character and the like. More specifically, the bullet path from the opponent character position to the nth aiming position in a virtual space is calculated, and whether this position is reachable is determined based on whether an obstacle is present or absent on the bullet path.

As described above, even when an obstacle exists on the bullet path, the reaching determining unit 244 determines that that position is reachable only if the obstacle is near the own character and the position is in the field of vision.

The game device 200, upon determination that the position is not reachable (the position cannot be reached) (step S305; No), allows the process to proceed to step S307, which will be described below.

Conversely, upon determination that the position is reachable (step S305; Yes), the game device 200 registers the nth aiming position in the candidate list (step S306).

Specifically, when the reaching determining unit 244 determines that the nth aiming position is reachable, information thereon is registered in the candidate list.

The game device 200 determines whether the variable n is the largest value (step S307). In other words, whether determination has been completed for the 24th aiming position, which is the largest value, is determined.

Upon determination the variable n is not the largest value (step S307; No), the game device 200 adds 1 to the value n so that the determination process proceeds to determination for the next aiming position (step S308). Then the process is returned to step S305.

By repeating the abovementioned steps S305 to S308, whether each aiming position is reachable is determined, and only the reachable positions are registered in the candidate list.

Upon the aforementioned determination in step S307 that the variable n is the largest value (step S307; Yes), the game device 200 decides one aiming position from the candidate list (step S309).

Specifically, the aiming position deciding unit 245 randomly decides, from among the aiming positions registered in the candidate list, one aiming position where a bullet is to be actually reached.

When no aiming position is registered in the candidate list, the aiming position deciding process may end by omitting the following process. Alternatively, the process may return to step S303 to restart the process from the selection of aiming positions.

The game device 200 generates an image of shooting at the decided aiming position (step S310).

Specifically, the image drawing unit 250 generates a game image of a bullet hitting a position near the own character Jc, as illustrated above in FIGS. 7A and 7B.

In the aforementioned aiming position deciding process, the first selection step is to select a predetermined number of aiming positions near the own character. A plane is defined with respect to the viewpoint position, and the plane is divided into a plurality of blocks. Aiming positions are randomly selected in each of the blocks, and the selected aiming positions are to some extent spread around near the own character.

In the second selection step of the aiming position deciding process, whether an obstacle exists between the opponent character (sniper) and the aiming position is checked, and only the hittable positions near the own character are registered in the candidate list. Specifically, among the aiming positions selected in the first step, only the positions which can be actually reached by a bullet (or nearby positions with an obstacle which can be hit by a bullet) are determined.

At least one aiming position is randomly decided from among the aiming positions that have passed the first and second selection steps (i.e. registered in the candidate list). The opponent character shoots at the decided aiming position (s).

As a result, a bullet surely hits a position near the own character in the field of vision. The scene of the bullet hitting that position is displayed as a game image. The level of tension is properly raised, and the player can find out an approximate position of the opponent character and the like.

Consequently, an exciting gunfight can be properly presented.

(Another Embodiment)

In the foregoing embodiment, a situation of third person viewpoint, where the own character is viewed entirely from the viewpoint position, is explained as an example. The present invention is appropriately applicable to a situation of first person viewpoint (subjective viewpoint), where the viewpoint position is a shoulder of the own character or the like.

For example, as illustrated in FIG. 9A, even when the viewpoint V is a first person viewpoint, the plane defining unit 241 defines a horizontal plane F, as in the case of the aforementioned third person viewpoint. Specifically, a horizontal plane F with a rectangular shape, whose length in the depth direction (z-axis direction) is varied based on the position of the viewpoint V (elevation angle, etc.), is defined.

Also, as in the third person viewpoint situation, the block division unit 242 divides the plane F into four blocks.

Here, the aiming position selecting unit 243 selects, unlike the third person viewpoint situation, aiming positions only in two blocks on the deeper side in the depth direction. Specifically, as illustrated in FIG. 9B, the aiming position selecting unit 243 randomly selects six aiming positions only in each of the blocks B3 and B4, which are on the foremost side of the field of view (Z-axis direction). In other words, no aiming positions are selected in the blocks B1 and B2, which are out of bounds of the field of view.

In the ensuing process, as in the third person viewpoint situation, the reaching determining unit 244 determines whether aiming positions are reachable and registers only the reachable ones in the candidate list. The aiming position deciding unit 245 randomly decides, from among the aiming positions listed in the candidate list, one position which is to be actually reached by a bullet.

As illustrated in FIG. 9C, the plane defining unit 241 may define a plane F2, from which an area out of bounds of the field of vision is excluded. The block division unit 242 divides the plane F2 into two blocks.

Then, as illustrated in FIG. 9D, the aiming position selecting unit 243 randomly selects six aiming positions in each of two divided blocks B5 and B6.

In the following process, as in the third person viewpoint situation, the reaching determining unit 244 determines whether aiming position are reachable and registers only the reachable ones in the candidate list. The aiming position deciding unit 245 randomly decides, from among the aiming positions registered in the candidate list, one position which is to be actually reached by a bullet.

After the aiming position is decided in this manner, the image drawing unit 250 generates, as in the third person viewpoint situation, a game image illustrating a scene of a bullet hitting a position near the own character.

Consequently, a gunfight with a high level of tension can be properly presented.

In the above embodiments, a situation where the plane defining unit 241 defines a flat plane is explained. However, a non-horizontal plane may be defined based on the topography of the area around the own character and the like.

Figure 10A:
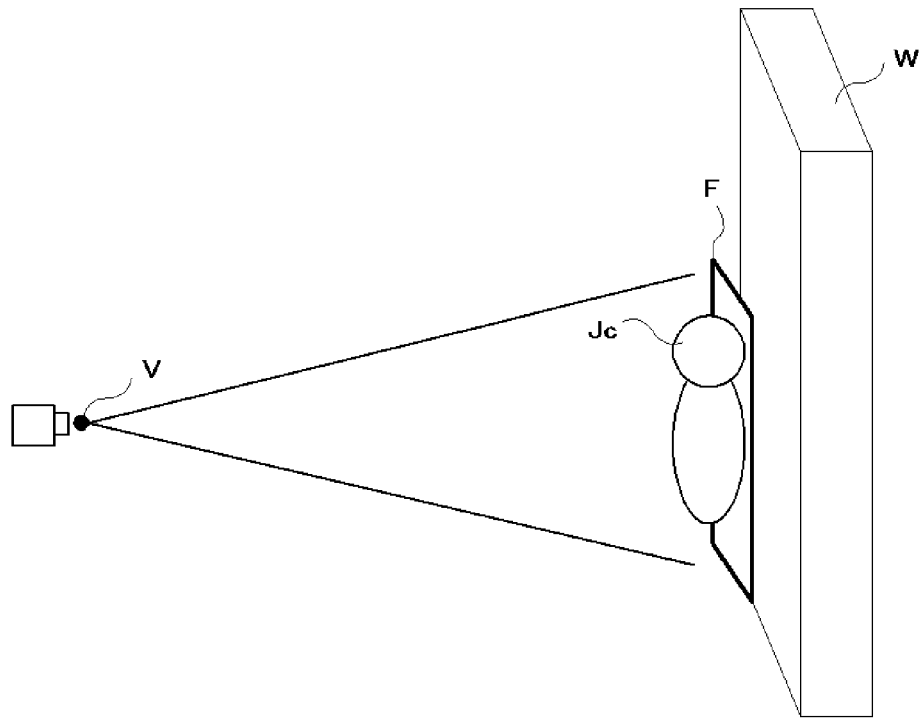
FIG. 10A is a diagram explaining an example of defining a non-horizontal plane.

For example, as illustrated in FIG. 10A, when the own character Jc is leaning on a wall W for hiding and all bullets shot by the opponent character hit the wall W, the plane defining unit 241 may define a vertical plane.

Figure 10B:
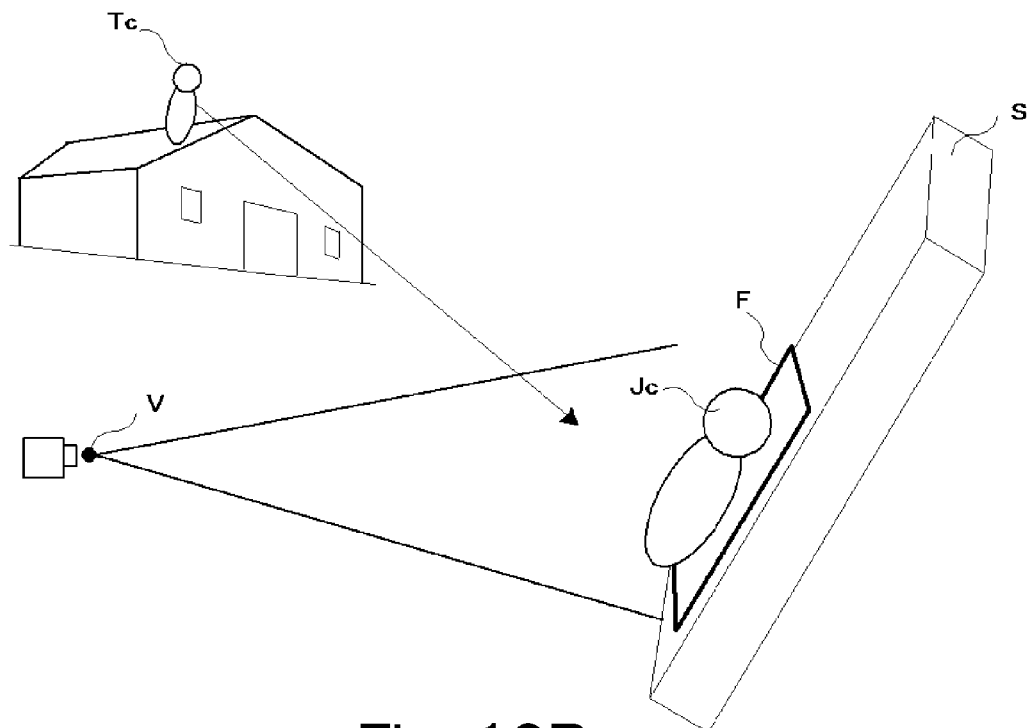
FIG. 10B is a diagram explaining an example of defining a non-horizontal plane.

Also, as illustrated in FIG. 10B, when the own character Jc is scaling a slope S (a steeply angled wall, etc.), the opponent character Tc shoots from a higher position. In this situation, the plane defining unit 241 may define a plane that is inclined so that its angle is adjusted to that of the slope S or that it is aligned with the direction of the opponent character Tc.

The area on the wall W and the slope S that can be hit by a bullet in the abovementioned cases can be greater than the hittable area of the situation where a horizontal plane is defined. Aiming positions finally decided by the aiming position deciding unit 245 may be properly spread.

As a result, a gunfight with a high level of tension can be properly presented.

In the above embodiments, a situation where the opponent character fires a bullet (cannon) is explained as an example, but the present invention is not limited to a bullet. It is appropriately applicable to various kinds of moving objects (flying and injected objects), such as a thrown spear and stone and a shot arrow.

As explained above, according to the present invention, the level of tension while being exposed to attack can be properly raised.

A priority is claimed for the present application based on Japanese Patent Application No. 2007-307682, and the contents thereof are incorporated herein in their entirety.

INDUSTRIAL APPLICABILITY

As explained above, a game device, image generation method, information recording medium, and program that can properly enhance the level of tension while being exposed to attack can be provided.

The invention claimed is:

1. A game device wherein an opponent character shoots an object toward an own character in a virtual space, the device comprising:
   a dividing unit divides a predetermined plane in a field of vision, within whose bounds the own character exists, into a plurality of blocks;
   a selecting unit randomly selects a predetermined number of arbitrary target positions in each of the blocks thus divided, each arbitrary target position being in an area of one of the blocks which excludes an area corresponding to the own character;
   a determining unit determines whether the object can reach each of the target positions thus selected, based on a positional relationship with the opponent character, who is an attacker;
   a deciding unit randomly decides at least one target position from among the target positions determined to be reachable; and
   an image generating unit generates a game image including the own character attacked by the object being shot at the decided target position.

2. The game device according to claim 1, wherein the dividing unit divides a horizontal plane with a predetermined shape and a variable length in a depth direction, into a predetermined number of blocks, based on a virtual viewpoint position.

3. The game device according to claim 1, wherein the selecting unit selects, the target positions except an area corresponding to the own character in each of the blocks.

4. The game device according to claim 1, wherein the determining unit determines whether the object can reach target positions based on whether an obstacle is present or absent on paths between a position of the opponent character and the target positions.

5. The game device according to claim 4, wherein even when an obstacle exists on the path, the determining unit determines that the object can reach a target position if the obstacle is located near the own character in the field of vision; and
   when the deciding unit decides a target position on whose path an obstacle exists, the image generating unit generates a game image of the object colliding the obstacle.

6. An image generation method performed by a game device comprising a calculating unit and a drawing unit, wherein an opponent character shoots an object toward an own character in a virtual space, the method comprising:
   a dividing step, wherein the calculating unit divides a predetermined plane in a field of vision, within whose bounds the own character exists, into a plurality of blocks;
   a selecting step, wherein the calculating unit randomly selects a predetermined number of arbitrary target positions in each of the blocks thus divided, each arbitrary target position being in an area of one of the blocks which excludes an area corresponding to the own character;
   a determining step, wherein the calculating unit determines whether the object can reach each of the target positions thus selected, based on a positional relationship with the opponent character, who is an attacker;
   a deciding step, wherein the calculating unit randomly decides at least one target position from among the target positions determined to be reachable; and
   an image generating step, wherein the drawing unit generates a game image including the own character attacked by the object being shot at the decided target position.

7. A non-transitory information recording medium recording a program that causes a computer, wherein an opponent character shoots an object toward an own character in a virtual space, to act as:
   a dividing unit divides a predetermined plane in a field of vision, within whose bounds a character exists, into a plurality of blocks;
   a selecting unit randomly selects a predetermined number of arbitrary target positions in each of the blocks thus divided, each arbitrary target position being in an area of one of the blocks which excludes an area corresponding to the own character;
   a determining unit determines whether the object can reach each of the target positions thus selected, based on a positional relationship with the opponent character, who is an attacker;
   a deciding unit randomly decides at least one target position from among the target positions determined to be reachable; and
   an image generating unit generates a game image including the own character attacked by the object being shot at the determined target position.

8. A program stored on a non-transitory information recording medium that causes a computer, wherein an opponent character shoots an object toward an own character in a virtual space, to act as:
   a dividing unit divides a predetermined plane in a field of vision, within whose bounds a character exists, into a plurality of blocks;
   a selecting unit randomly selects a predetermined number of arbitrary target positions in each of the blocks thus divided, each arbitrary target location being in an area of one of the blocks which excludes an area corresponding to the own character;
   a determining unit determines whether the object can reach each of the target positions thus selected, based on a positional relationship with the opponent character, who is an attacker;
   a deciding unit randomly decides at least one target position from among the target positions determined to be reachable; and
   an image generating unit generates a game image including the own character attacked by the object being shot at the decided target position.

* * * * *